(12) United States Patent
Peng

(10) Patent No.: US 11,153,525 B2
(45) Date of Patent: Oct. 19, 2021

(54) METHOD AND DEVICE FOR VIDEO ENHANCEMENT, AND ELECTRONIC DEVICE USING THE SAME

(71) Applicant: GUANGDONG OPPO MOBILE TELECOMMUNICATIONS CORP., LTD., Guangdong (CN)

(72) Inventor: Deliang Peng, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 26 days.

(21) Appl. No.: 16/695,154

(22) Filed: Nov. 25, 2019

(65) Prior Publication Data

US 2020/0169687 A1 May 28, 2020

(30) Foreign Application Priority Data

Nov. 27, 2018 (CN) .......................... 201811429239.5

(51) Int. Cl.
*H04N 5/57* (2006.01)
*H04N 7/01* (2006.01)
(Continued)

(52) U.S. Cl.
CPC .......... *H04N 5/57* (2013.01); *G11B 15/1875* (2013.01); *H04N 7/01* (2013.01); *H04N 9/646* (2013.01);
(Continued)

(58) Field of Classification Search
None
See application file for complete search history.

(56) References Cited

U.S. PATENT DOCUMENTS

2003/0081133 A1* 5/2003 Lee .................... H04N 5/23293
348/229.1
2004/0223007 A1* 11/2004 Mamata ................... G09G 3/20
345/690
(Continued)

FOREIGN PATENT DOCUMENTS

CN 101710924 5/2010
CN 105898252 8/2016
(Continued)

OTHER PUBLICATIONS

EPO, Office Action for EP Application No. 19211902.2, dated Mar. 30, 2020.
(Continued)

*Primary Examiner* — Aneeta Yodichkas
(74) *Attorney, Agent, or Firm* — Hodgson Russ LLP

(57) ABSTRACT

A method and a device for video enhancement, and an electronic device are provided, in accordance with embodiments of the present disclosure. In the method, a current brightness of a display panel of the electronic device is obtained when a video is playing in the display panel. The current brightness may be compared with a target brightness, and a comparing result is obtained. An effect of video enhancement, which configured to be applied to the video, is determined according to the comparing result. The video is processed according to a video enhancement corresponding to the effect of video enhancement. Therefore, in the process of the video enhancement for the electronic device while playing video, the video may be displayed with extremely clear images and may have an extremely clear visual effect.

19 Claims, 11 Drawing Sheets

(51) Int. Cl.
 *H04N 9/64* (2006.01)
 *G11B 15/18* (2006.01)

(52) U.S. Cl.
 CPC ..... *G09G 2320/02* (2013.01); *G09G 2320/06* (2013.01); *G09G 2320/0626* (2013.01)

(56) References Cited

U.S. PATENT DOCUMENTS

| | | |
|---|---|---|
| 2005/0207046 A1 | 9/2005 | Tamura |
| 2008/0049049 A1* | 2/2008 | Park ................ G09G 3/20 345/690 |
| 2017/0324939 A1 | 11/2017 | Fan |

FOREIGN PATENT DOCUMENTS

| | | |
|---|---|---|
| CN | 106792178 | 5/2017 |
| CN | 106993176 | 7/2017 |
| CN | 109618228 | 4/2019 |
| WO | WO-2017157109 A1 * | 9/2017 ............. G06T 5/005 |

OTHER PUBLICATIONS

SIPO, Second Office Action for CN Application No. 201811429239.5, dated May 11, 2020.
WIPO, ISR and WO for PCT/CN2019/121154, dated Mar. 13, 2020.
CNIPA, First Office Action for CN Application No. 201811429239.5, dated Dec. 18, 2019.
IPI, Office Action for IN Application No. 201914048502, dated Mar. 11, 2021.
SIPO, Notification to Grant Patent Right for Invention for CN Application No. 201811429239.5, dated Feb. 4, 2021.

* cited by examiner

METHOD AND DEVICE FOR VIDEO ENHANCEMENT, AND ELECTRONIC DEVICE USING THE SAME

CROSS-REFERENCE TO RELATED APPLICATION

This application claims priority to a Chinese Patent Application No. 201811429239.5, filed on Nov. 27, 2018, the entire disclosure of which is incorporated herein by reference.

TECHNICAL FIELD

The present disclosure relates to the field of image processing technologies in general. More particularly, and without limitation, the disclosed embodiments relate to a method and a device for video enhancement, and an electronic device using the same.

BACKGROUND

With the development of society, electronic devices with display panels are widely used. For example, a display panel is configured to display images such as pictures and videos thereon. A display quality of most electronic devices may be affected by changes in ambient light sources or a quality of the source of the video.

SUMMARY

In a first aspect, the present disclosure provides a method for video enhancement, which is applied to an electronic device. In the method, a current brightness of a display panel of the electronic device is obtained when a video is playing in the display panel. The current brightness may be compared with a target brightness, and a comparison is obtained. An effect of video enhancement is determined according to the comparing result. The video is processed according to a video enhancement corresponding to the effect of video enhancement.

In a second aspect, the present disclosure provides a device for video enhancement, which is applied to an electronic device. The device includes a parameter obtaining unit, a parameter comparison unit, an effect determination unit, an effect determination unit, and a video enhancement unit. The parameter obtaining unit is configured to obtain a current brightness of a display panel of the electronic device when a video is playing in the display panel. The parameter comparison unit is configured to compare the current brightness with a target brightness, and obtain a comparing result. The effect determination unit is configured to determine an effect of video enhancement according to the comparing result. The video enhancement unit is configured to process the video according to a video enhancement to the video corresponding to the effect of video enhancement.

In a third aspect, the present disclosure provides an electronic device. The electronic device includes one or more processors, a video codec, a memory, and one or more programs. The one or more programs are stored in the memory and configured to be executed by the one or more processors; and the one or more programs configured to perform the method described above.

In a fourth aspect, the present disclosure provides a computer readable storage medium. The computer readable storage medium stores a plurality of instructions adapted to be executed to perform the method described above.

BRIEF DESCRIPTION OF THE DRAWINGS

The accompanying drawings, which are incorporated in and constitute a part of this specification, illustrate exemplary embodiments of the present disclosure, and together with the description, serve to explain the principles of the disclosure.

DETAILED DESCRIPTION

Figure 1:
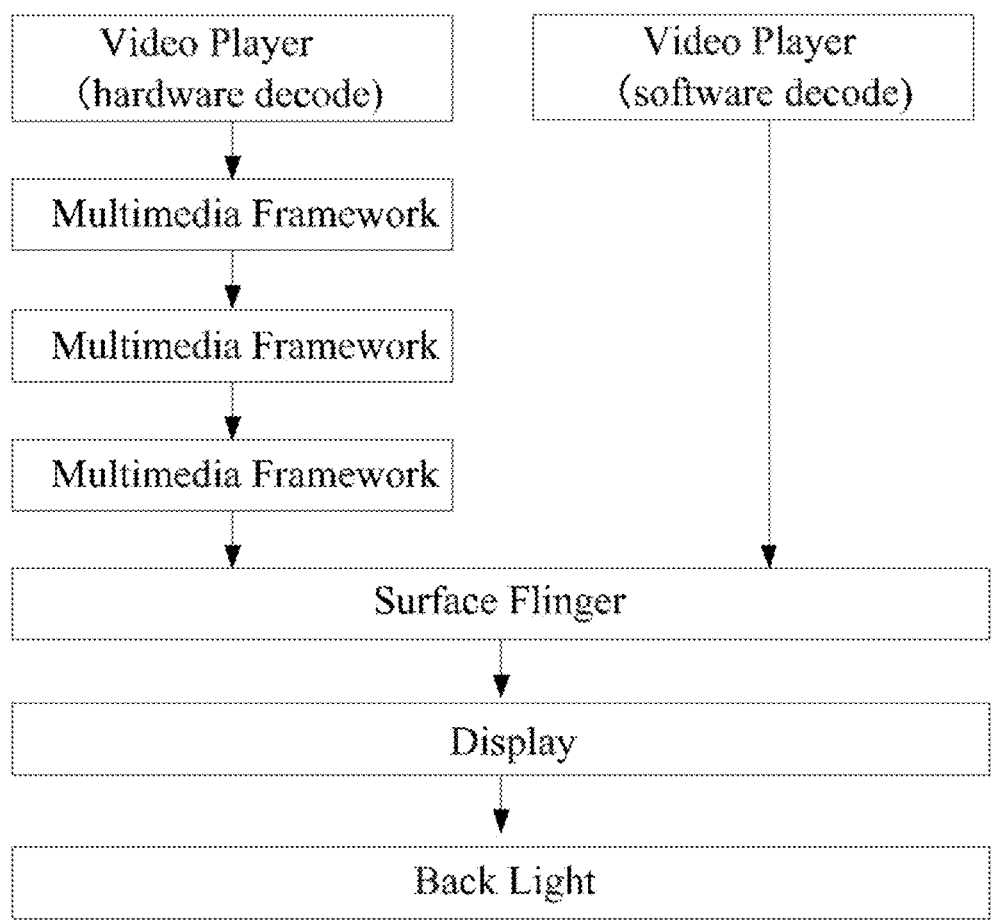
FIG. 1 illustrates a schematic diagram of a video processing architecture, in accordance with an embodiment of the present disclosure.

The technical solutions in the embodiments of the present disclosure will be clearly and completely described in the following with reference to the accompanying drawings. It is understood that the specific embodiments described herein are merely illustrative of the disclosure and are not intended to limit the disclosure. It should also be noted that, for ease of description, only some but not all of the structures related to the present disclosure are illustrated in the drawings. All other embodiments obtained by those skilled in the art based on the embodiments of the present disclosure without any creative efforts are fall in the scope claimed by the present disclosure.

With development of the hardware performance of electronic devices, more and more electronic devices are capable of playing videos. For example, the electronic device can play videos by applying a video playback client, wherein the video playback client can display the videos requested from the network. For another example, the electronic device can play videos by running a web browser, wherein the videos is displayed in the web browser. For still another example, the electronic device can play videos by applying a video playback application, such as a video player, in which the video is locally stored in the electronic device.

A video may be compressed and encoded after generated, in order to reduce an occupation of a needed storage space and facilitate transmission via the network, no matter how the video is playing, such as playing in the web browser or the video playback application. Correspondingly, the electronic device may firstly obtain a compressed and encoded video after the electronic device acquires the video, and then the compressed and encoded video may be decompressed and decoded by the electronic device.

Generally, as illustrated in FIG. 1, the electronic device can be capable of decoding a video by both of hardware decode and software decode. The hardware decode refers to an operation of decoding using non-CPU, such as a GPU (Graphics Processing Unit), a dedicated Digital Signal Processor (DSP), a Field Programmable Gate Array (FPGA), an Application Specific Integrated Circuit (ASIC), and the like. The software decode refers to an operation of decoding using the CPU.

Particularly, as illustrated in FIG. 1, a Media Framework is configured to obtain a video to be played via an Application Programming Interface (API) of the video playback client or the web browser, and submit the video to a video decoder, wherein the Media Framework is a multimedia framework in an operating system of the electronic device.

Whether it is hardware decode or software decode, after a video data is decoded, the decoded video data is sent to a Surface Flinger, and then the decoded video data is rendered and synthesized by the Surface Flinger and may be displayed in a display panel of the electronic device. The Surface Flinger is a stand-alone service The Surface Flinger is configured to receive all surfaces as inputs, and calculate a position of each of the surface in a final composite image according to parameters such as Z Order, transparency, size, position, etc. And then the position of each of the surface is submitted to a HW composer or an Open Graphics Library (Open GL). The HW composer or the Open GL may generate a final buffer that to be displayed in a specific display device.

The inventors found that a visual enhancement operation may be applied to both of the operation of hardware decode and the software decode. The visual enhancement may be achieved by performing a video enhancement. So that the video may have a quality visual effect when displayed. For example, in the visual enhancement operation, a hollywood quality video (HQV) technology can be applied to perform an edge de-drying, adjust an exposure, or enhance a sharpness of the video. Furthermore, the visual enhancement operation may be performed in other ways to enhance the visual effect of the video being played, for example, a way by increasing color and brightness.

However, the inventors have further discovered that the control method for visual enhancement of the video has yet to be improved. Therefore, a method and device for video enhancement, and electronic device applying the method are provided in the present disclosure, which can improve a control convenience and intelligence.

The present disclosure will be described below in conjunction with embodiments.

Figure 2:
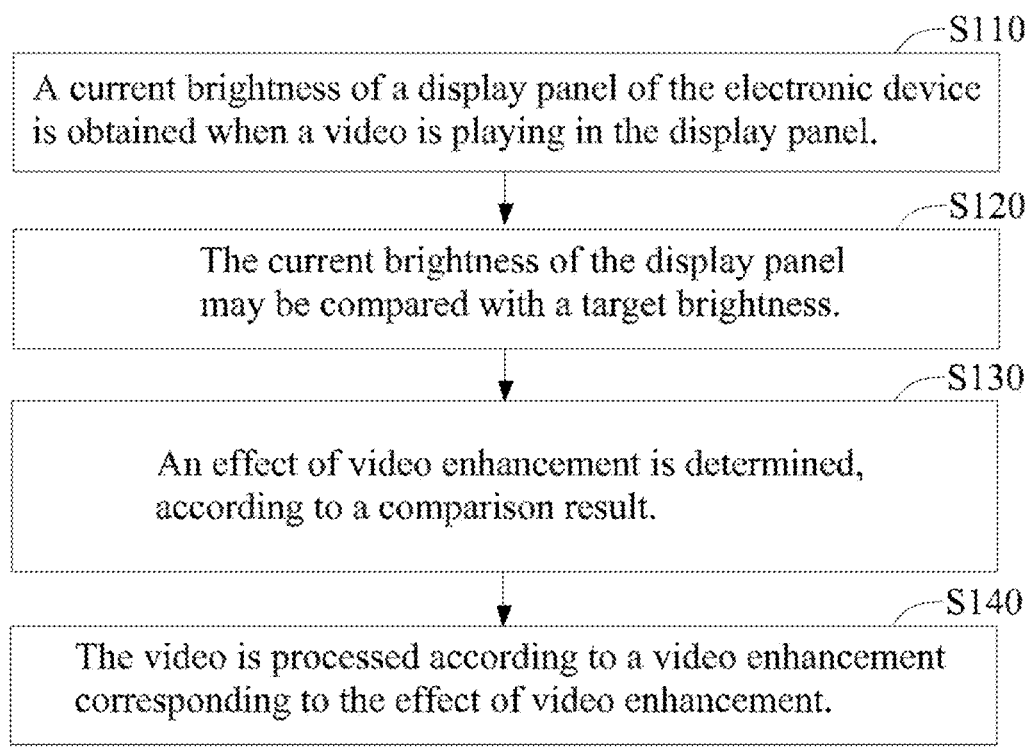
FIG. 2 illustrates a flowchart of a method for video enhancement in accordance with an embodiment of the present disclosure.

As illustrated in FIG. 2, a method for video enhancement is applied in an electronic device, in accordance with an embodiment of the present disclosure. In the method for video enhancement, the electronic device may process a video according to the video enhancement, to improve a visual effect of the video. The method may begin at block S110.

At block S110, a current brightness of a display panel of the electronic device is obtained when a video is playing in the display panel.

In some embodiments, the electronic device can be capable of decoding the video by hardware decode or software decode before playing the video. Whether it is hardware decode or software decode, after a video data is decoded, the decoded video data is sent to a Surface Flinger, and then the decoded video data is rendered and synthesized by the Surface Flinger and may be displayed in a display panel of the electronic device. Therefore, in some embodiments, before the block S110, the electronic device may firstly obtain a compressed and encoded video, the electronic device can be capable of decoding the video by both of hardware decode and software decode, in the process of decoding, the block S110 is performed, and the video is playing on the display panel.

In the present disclosure, the electronic device can determine whether it is currently displaying the video in various ways.

In an embodiment, the operation of determining whether the electronic device is displaying the video may include operations as the followings.

The electronic device is determined whether it is running a predetermined video player. The electronic device is determined as playing the video when the predetermined video player is running in the electronic device. The electronic device may pre-create a list of at least one video player. The list can be freely edited by a user of the electronic device, or can be determined according to a usage of the at least one video player.

Figure 3:
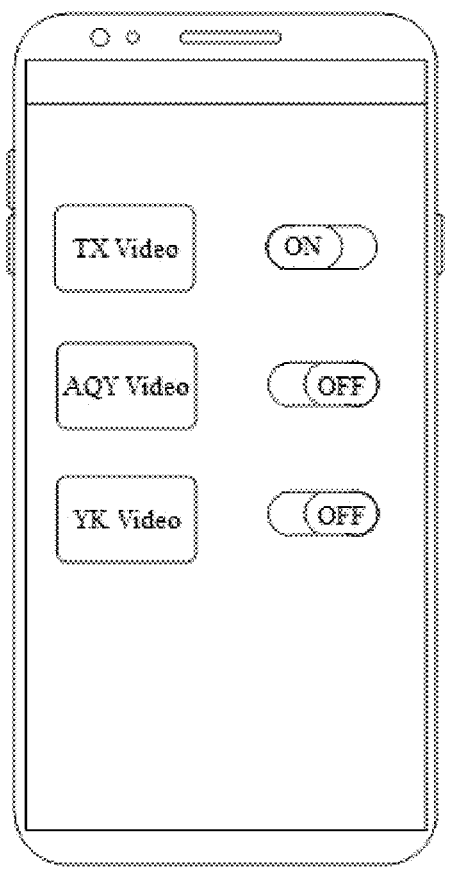
FIG. 3 illustrates a schematic diagram of a switch control icon for an application, in accordance with an embodiment of the present disclosure.

For example, as illustrated in FIG. 3, multiple applications and statuses corresponding to each of the applications are displayed in an interface illustrated in FIG. 3. It can be understood that an application may be removed from or prevented being added to the list mentioned above when the status corresponding to the said application is "off", and an application may be added to or remain being listed in the list above when the status corresponding to the said application is "on". For example, for an application named "TX Video", which has a corresponding status of "on", may be listed in the list mentioned above. For another example, for an application named "AQY Video", which has a corresponding status of "off", may not be listed in the list.

Furthermore, the electronic device can edit the list according to a usage frequency of each of the video players. For example, the electronic device may detect the usage frequency of each pf the video players, and may add one of the at least one video player to the list when the usage frequency of the said video player is greater than a predetermined frequency. And the status of the said video player, which is displayed in the interface in FIG. 3, is set as "on".

In this case, the electronic device can firstly acquire information of the currently running application that is running in foreground, and then further determine whether the currently running application is in the list, according to the information. The electronic device may determine that the video is currently playing when the currently running application is listed in the list. In an embodiment, the electronic device may obtain a named of the currently running application by executing a getting running tasks operating of an activity manager when the electronic device is operated basing on an Android operating system. Furthermore, the electronic device may obtain a list of at least one currently running application by operating a usage stats manager, and then determine an application to be the currently running application, which is the most recently run in the list. In addition, the electronic device may monitor a change of a focus of a current window thereof via an accessibility function of the Android operating system, and determine a corresponding package name of the focus window to be the currently running application in the foreground.

Alternatively, in another embodiment, the electronic device may determine whether a video is playing by detecting a return value of an audio manager. In the embodiment, the electronic device may firstly detect the return value of the audio manager to determine whether there is an audio output. The electronic device may further determine whether it is playing video by determining whether there is a video player running according to the audio output.

Figure 4:
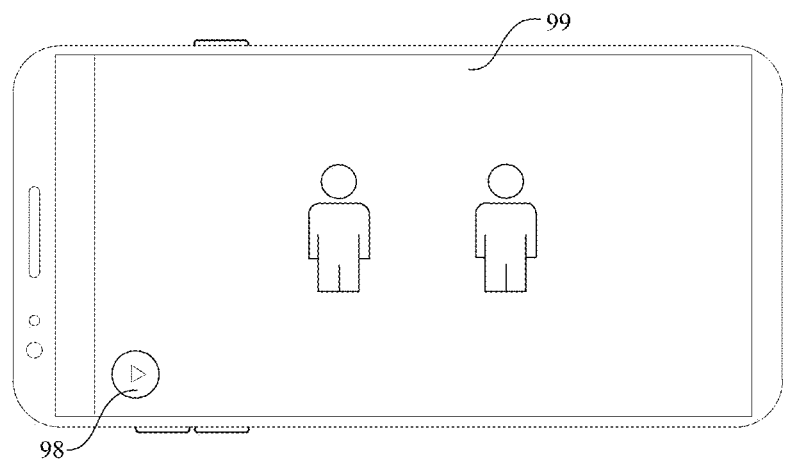
FIG. 4 illustrates a schematic diagram of a video playing interface, in accordance with an embodiment of the present disclosure.

Furthermore, in still another embodiment, the electronic device may determine whether it is playing video by detecting a touch status of a video playing button thereof. For example, as illustrated in FIG. 4, a playing button 98 is displayed in a video playing interface 99. The video playing interface 99 is in a status in which the video is paused. In this case, the electronic device is determined as playing video when the playing button 98 is touched.

The current brightness of the display panel may be obtained by reading a corresponding system parameters. It will be appreciated that the electronic device can be configured with a designated parameter in the system to indicate the current brightness of the display panel. Thus, the electronic device can obtain the current brightness of the display panel by obtaining a value of the designated parameter.

At block S120, the current brightness may be compared with a target brightness, and a comparison is obtained.

It can be understood that, in the present disclosure, the electronic device may perform a video enhancement basing on a predetermined configuration or basing on the current brightness, according to a comparing result of the current brightness and the target brightness. In some embodiments, before comparing the current brightness with the target brightness, the target brightness may be determined by the electronic device. The electronic device can determine the target brightness in multiple ways.

In an embodiment, the electronic device can determine the target brightness to be an expected brightness. For example, the expected brightness may be pre-stored in the electronic device. For another example, the expected brightness may be configurated by the use in advance. For still another example, the expected brightness may be input into the electronic device basing on an input instruction before the block S210. In this case, the electronic device may provide a control icon for setting the expected brightness in a configuration interface thereof or in the video playing interface thereof. The user can configure the expected brightness by operating the control icon for setting the expected brightness. And then the electronic device determines the target brightness to be the expected brightness determined by the user. It should be noted that the expected brightness determined by the user, which indicates the target brightness, is different from the current brightness of the display panel currently operated by the user. The current brightness remains unchanged when the user configures the expected brightness.

In another embodiment, the electronic device can automatically determine the target brightness according to a usage habits of the user. For example, the electronic device may obtain the expected brightness determined basing on an input instruction when the video is playing, and store the expected brightness associating with a light intensity of the environment in which the electronic device is currently located. In this case, the electronic device can determine the target brightness, that is corresponding to the light intensity of the environment in which it is located, to be a half of the expected brightness. Then, in this case, the electronic device may first obtain the current brightness, and determine the target brightness corresponding to the current brightness when playing video. In this way, the electronic device can accurately meet an expectation of the user while minimizing a power consumption of the electronic device.

In some embodiment, in order to accurately meet an expectation of the user, the electronic device can periodically update the target brightness stored therein. Alternatively, after the electronic device has previously stored the target brightness corresponding to a light intensity of the environment as a previous target brightness, the previous target brightness may be replaced by a subsequent target brightness when a target brightness is different from the previous target, wherein the subsequent target brightness is determined by the electronic device in a real-time mode. For example, the previously target brightness of 40 corresponding to an ambient light brightness of 70 may be store in the electronic device as the previous brightness. The electronic device may obtain the expected brightness determined by the user when playing the video in an environment with an ambient light brightness of 70. The expected brightness determined by the user may be 60, and a target brightness of 30 may be determined according to half of expected brightness of 60. In this case, the target brightness 30 is considered as the subsequent target brightness, and corresponding to an ambient light brightness of 70. Because the previously target brightness of 40 is different from the subsequent target brightness of 30, the previous target brightness of 40, which is corresponding to the ambient light brightness of 70, may be replaced by the subsequent target brightness of 30.

At block S130, an effect of video enhancement is determined according to the comparing result. The effect of video enhancement is a reference for processing the playing video.

The effect of video enhancement may indicate a quality of the video after enhancement. In accordance with embodiment of present disclosure, the effect of video enhancement may include multiple levels of video enhancement, such as a first level enhancement effecting less on the video, a second level enhancement effecting more on the video relative to the first level enhancement, and a third level enhancement effecting most on the video relative to the second level enhancement, and basic level enhancement having no or a little effect on the video. In some embodiment, the effect enhancement may be determined to be a first effect or a second effect according to the comparison result, wherein the first effect and the second effect are both selected from the first level enhancement, the second level enhancement, the third level enhancement, and the basic level enhancement. In one embodiment, the smaller the current brightness is, the weaker a corresponding video enhancement effect is. For example, when the current brightness is large (e.g. greater than a threshold), the effect of video enhancement may be determined to be the basic level enhancement, which indicates that, the operation of processing the video according to a video enhancement corresponding to the effect of video enhancement is not performed.

At block S140, the video is processed according to a video enhancement corresponding to the effect of video enhancement.

In some embodiment, the video is processed by adjusting at least one parameters of images of the video, according to a video enhancement corresponding to the effect of video enhancement.

The electronic device usually provides virous serial images successively in a frequency of the video to display on the display panel when the video is playing. Thereby the video is displayed on the display panel, in a visual sensation of the user, wherein each of the images is considered as a frame of the video. The video enhancement is applied to the video by applying an image enhancement to images of the video. In other words, the video is processed by adjusting at least one parameters of images of the video according to a video enhancement corresponding to the effect of video enhancement. Therefore, the electronic device may be configured with virous image parameters, and may play the video according to the image parameters. The electronic device may determine at least one of the image parameters, and display the images of the video basing on the at least one of the image parameters, when processing the video according to the video enhancement.

In some embodiments, operations of determining the image parameters may include at least one of the following operations: an operation of increasing an exposure, an operation of noise-reduction, an operation of increasing contrast, and an operation of image sharpening.

The image parameters may include at least one of a sharpness parameter, a lens stretch parameter, a color parameter, a clarity parameter, a brightness parameter, a contrast parameter, a color gamut parameter, a purity parameter, a noise reduction parameter, and a saturation level parameter. It can be understood that different types of videos can be enhanced by adjusting different parameters selected from the above image parameters. For example, a video, which is playing in a display panel with a large brightness (greater than a predetermined brightness threshold), may be enhanced according to all of the image parameters mentioned above; and a video, which is playing in a display panel with a low brightness (less than a predetermined brightness threshold), may be enhanced according to only some of the image parameters mentioned above.

Particularly, a video content displayed by the electronic device may contain a decoded image contents. Because the decoded image content is formatted by data in RGBA format, the data in RGBA format may be converted into data in HSV format in order to optimize the image content. Particularly, in the operation of converting the data in RGBA format to the data in HSV format, a histogram of the image content of images of the video is obtained, and a statistics may be applied to the histogram. So as to obtain a converting parameter for converting the data in RGBA format into the data in HSV format. And then the data in RGBA format is converted into the data in HSV format basing on the converting parameter.

In some embodiment, an exposure is increased in the operation of video enhancement at block 140, which is used to increase a brightness of the image. In one embodiment, a region in the histogram of the image, which has a lower brightness, may be brightened according to the histogram. In other embodiments, the image may be brightened by a non-linear superposition. Particularly, an item I is configured to indicate a darker image that is to be processed, an item T is configured to indicate a bright image after processing relative to the dark image. The items T and I are both pixel values that equal to 0 or 1, of the images in a binarized format. A process of exposure enhancement, which is performed with the non-linear superposition, may be executed with algorithm of $T(x)=I(x)+(1-I(x))*I(x)$. The algorithm may be iterated multiple times to ensure a quality of the exposure enhancement.

In some embodiment, a noise-reduction may be applied to the image at block 140, which is used to reduce a noise of the image. Because the image is often degraded and affected by various noises when the image is generated and transmitted, which results in a degradation of a quality of the image. A procedure of processing to the image in sequence, and a visual effect of the image may be affected adversely. There are many types of noise, such as electrical noise, mechanical noise, channel noise and other noise. Therefore, a preprocessed of noise-reduction should be applied to the image, in order to reduce noise, and improve the quality of the image, and facilitate higher level processing to the image. From the probability distributions of noise, the noise may include Gaussian noise, Rayleigh noise, gamma noise, exponential noise and uniform noise.

Particularly, the image can be denoised by a Gaussian filter. The Gaussian filter is a linear filter capable of effectively suppressing noise and smoothing the image. A principle of the Gaussian filter is similar to that of an averaging filter. The Gaussian filter may take an average of pixels in a filter window thereof as an output. Coefficients of a template window of the Gaussian filter are different from that of the averaging filter. All of the coefficients of the averaging filter are the same as 1; while the coefficients of the Gaussian filter may decrease with an increase of a distance between positions of the template window from the center of the template. Therefore, the Gaussian filter is less blurred to the image than the averaging filter.

For example, a 5×5 Gaussian filter window is generated, and the center of the template is taken as the coordinate origin when sampling. The coordinates of each of regions of the template window are brought into the Gaussian function and calculated, and an obtained value is generated, the coefficient of the template window is determined to be the obtained value. The image may be denoised by convolving the Gaussian filter window with the image.

In some embodiment, an edge enhancement is applied to the image in block S140, which is used to make a blurred image clearer. The edge enhancement may be applied in two ways including a differentiation and a high-pass filter (HPS).

In some embodiment, a contrast increase is applied to the image in block S140, which is used to enhance the image quality of the image, so that the color in the image is more vivid. Particularly, an operation of enhancing the image quality of the image may be performed in a way of a contrast stretching. The operation of the contrast stretching belongs to a gradation transformation operation. A gray scale may extend and range from 0 to 255 in a gradation transformation operation, resulting in an obviously greatly enhancement to the contrast. A formula may be applied to map the gray value of a pixel to a larger gray space, as following: $I(x,y)=[I(x,y)-I\min)/(I\max-I\min)](MAX-MIN)+MIN$;

Wherein I min is a minimum gray value of an original image, and I max is a maximum gray value of the original image, and MIN is a maximum gray value of the gray space to be stretched, and MAX is a maximum gray value of the gray space to be stretched.

In the method for video enhancement provided in the present disclosure, a current brightness of a display panel of the electronic device is obtained when a video is playing in the display panel. The current brightness may be compared with a target brightness. An effect of video enhancement is determined according to a comparing result of the current brightness and the target brightness. The video is processed according to a video enhancement corresponding to the effect of video enhancement. Therefore, in the process of the video enhancement for the electronic device while playing video, the electronic device can flexibly determine the effect of video enhancement according to the current brightness. Thereby a flexibility of an adjustment video enhancement effect may be achieved, and a user experience is improved.

Figure 5:
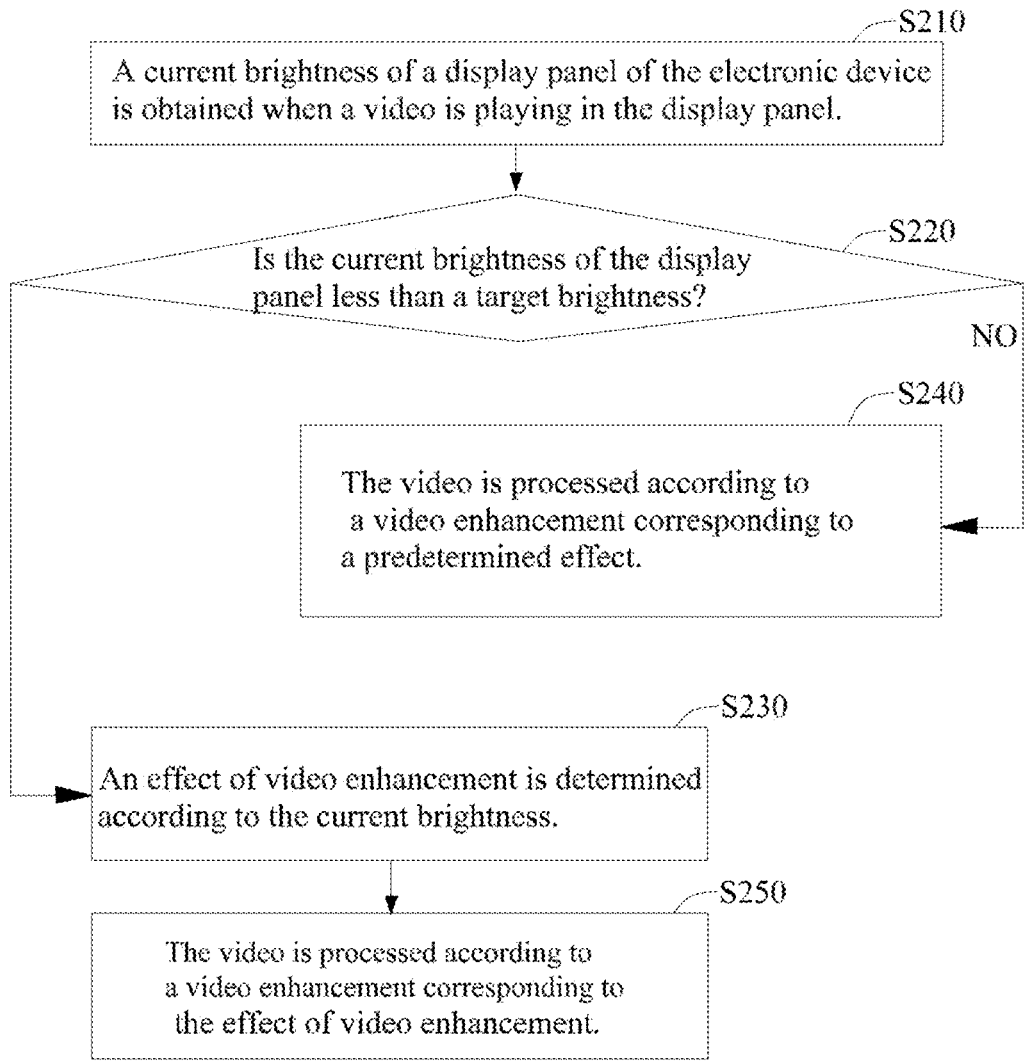
FIG. 5 illustrates a flowchart of a method for video enhancement, in accordance with another embodiment of the present disclosure.

As illustrated in FIG. 5, a method for video enhancement is applied in an electronic device, in accordance with another embodiment of the present disclosure. The method may begin at block S210.

At block S210, the current brightness of a display panel of the electronic device is obtained when the video is playing in the display panel.

At block S220, the current brightness may be compared with a target brightness.

At block S230, an effect of video enhancement is determined according to the current brightness, when the current brightness is less than the target brightness. The video may be processed according to a video enhancement corresponding to the effect of video enhancement, and the smaller the current brightness is, the weaker a corresponding video enhancement effect is.

It should be noted that when the current brightness is less than the target brightness, it means that the user currently does not expect to watch the video with higher brightness. In this case, an effect of video enhancement may be weakened when the current brightness of the current display panel is smaller than a predetermined threshold. In this case, the effect of video enhancement is determined according to the current brightness when the brightness of the display panel is less than the target brightness. The video may be processed according to a video enhancement corresponding to the effect of video enhancement. The effect of video enhancement on the video can be such that the video enhancement can be performed as well as the enhanced effect can be determined according to the brightness.

In an embodiment, in an operation of determining the effect of video enhancement on the video according to the current brightness, at least one video enhancement parameter corresponding to the current brightness may be obtained; and the effect of video enhancement is determined according to the at least one video enhancement parameter. The smaller the current brightness is, the weaker a corresponding video enhancement effect indicated by the at least one video enhancement parameter is.

Alternatively, in an operation of determining the effect of video enhancement on the video according to the current brightness, at least one video enhancement parameter corresponding to the current brightness may be obtained; and the effect of video enhancement is determined according to the at least one video enhancement parameter. The smaller the current brightness is, the weaker a corresponding video enhancement effect indicated by the at least one video enhancement parameter is.

In an embodiment, the less the brightness of the display panel is, the smaller an extent of the effect of video enhancement indicated by the at least one corresponding video enhancement parameters is. In other embodiments, the less the brightness of the display panel is, the less the amount of the at least one video enhancement parameters is.

Particularly, in the case of which the less the brightness of the display panel is, the smaller the extent of the effect of video enhancement indicated by the at least one corresponding video enhancement parameters is, the video enhancement may be performed basing on a plurality of video enhancement parameters. And at least one of the plurality of video enhancement parameters may be decreased in value, when the current brightness is less than the target brightness. For example, the electronic device may perform a video enhancement basing on the contrast, the sharpness, and the saturation. And a first parameter corresponding to the contrast, a second parameter corresponding to the sharpness, and a third parameter corresponding to the saturation are configured in the electronic device. The first parameter indicates an enhancement extent of the contrast of the video, while the second parameter indicates an enhancement extent of the sharpness, and the third parameter indicates an enhancement extent of the saturation.

Then at least one of the first parameter, the second parameter, and the third parameter may be reduced in value, when the current brightness is less than the target brightness. Certainly, the at least one or more of the first parameter, the second parameter, and the third parameter, which will be reduced in value, is determined according to different actual scenarios.

Furthermore, in the case of which the less the brightness of the display panel is, the smaller the extent of the effect of video enhancement indicated by the at least one corresponding video enhancement parameters is, the video enhancement may be performed basing on a plurality of video enhancement parameters. And at least one of the plurality of video enhancement parameters may be decreased in value, when the current brightness is less than the target brightness. For example, the electronic device may perform a video enhancement basing on the contrast, the sharpness, and the saturation. And a first parameter corresponding to the contrast, a second parameter corresponding to the sharpness, and a third parameter corresponding to the saturation are configured in the electronic device. The first parameter indicates an enhancement extent of the contrast of the video, while the second parameter indicates an enhancement extent of the sharpness, and the third parameter indicates an enhancement extent of the saturation.

Then, at least one of an enhancement effect basing on the first parameter, an enhancement effect basing on the second parameter, and an enhancement effect basing on the third parameter, may be ignored, when the current brightness is less than the target brightness. Certainly, in the enhancement effects basing the at least one or more of the first parameter, the second parameter, and the third parameter, which may be ignored, is determined according to different actual scenarios.

In another embodiment, an operation, of determining the effect of video enhancement on the video according to the current brightness, may include operations as following. A difference between the current brightness and the target brightness is determined; a video enhancement parameter corresponding to the difference is obtained, wherein the larger the difference is, the weaker a corresponding video enhancement effect indicated by the video enhancement parameters is; and the effect of video enhancement may be determinized basing on the video enhancement parameter.

In some embodiment, in block S230, a video enhancement is determined corresponding to the effect of video enhancement when the current brightness is not less than the brightness threshold, while an effect of video enhancement is determined to be a predetermined effect when the current brightness is not less than the target brightness.

At block S240, the video is processed according to a video enhancement corresponding to a predetermined effect when the current brightness is not less than the target brightness.

At block S250, the video is processed according to a video enhancement corresponding to the effect of video enhancement determined in block S230.

In one embodiment, in an operation of processing the video according to the video enhancement corresponding to the effect of video enhancement, the video enhancement may be applied to the video based on the at least one video enhancement parameter.

In the method for video enhancement provided in the present disclosure, a current brightness of a display panel of the electronic device is obtained when a video is playing in the display panel. The current brightness may be compared with a target brightness. An effect of video enhancement on the video is determined according to the current brightness when the current brightness is less than the target brightness. Therefore, in the process of the video enhancement for the electronic device while playing video, the electronic device can flexibly determine the effect of video enhancement according to the current brightness. Thereby a flexibility of an adjustment video enhancement effect may be achieved, and a user experience is improved.

Figure 6:
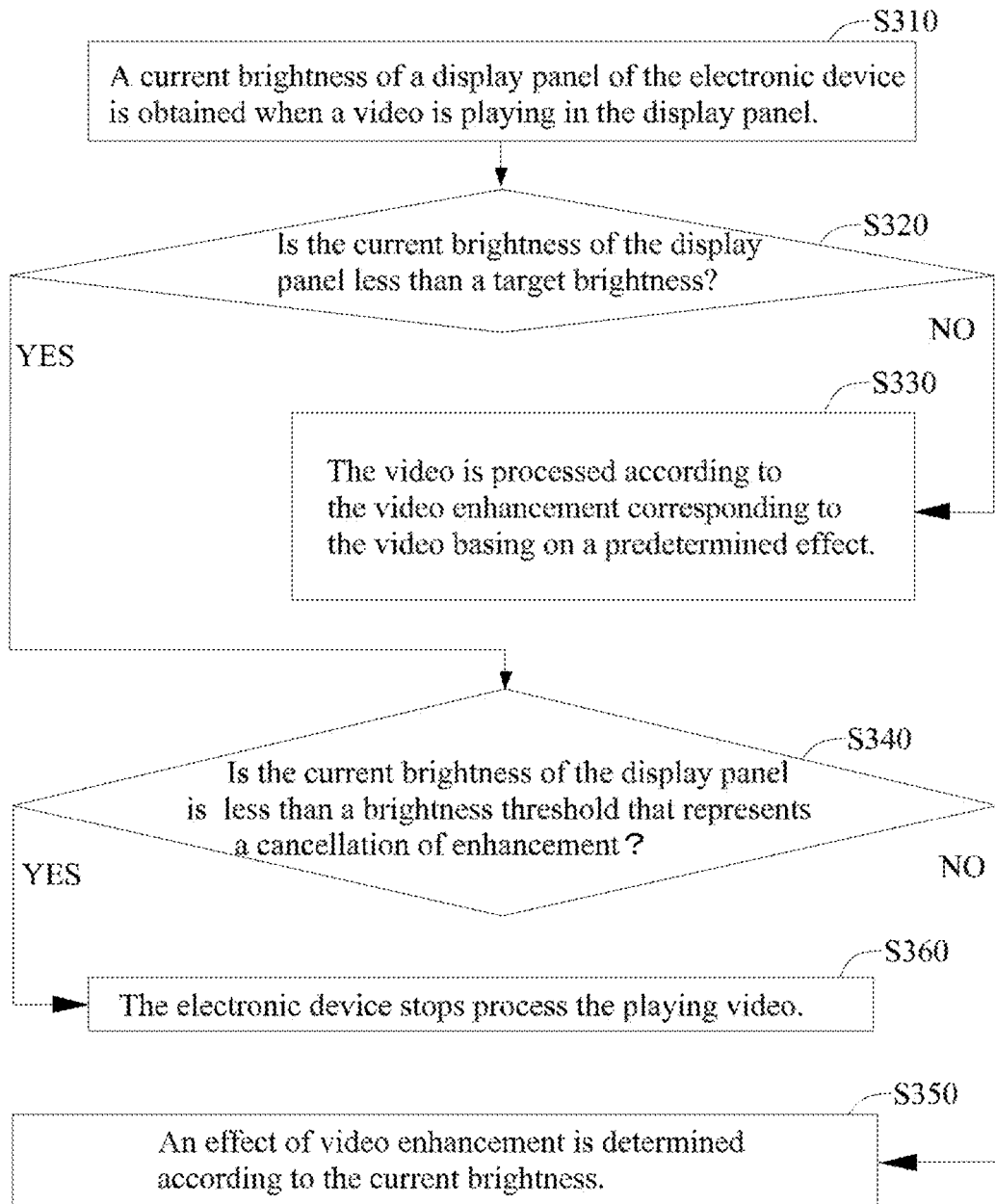
FIG. 6 illustrates a flowchart of a method for video enhancement, in accordance with still another embodiment of the present disclosure.

As illustrated in FIG. 6, a method for video enhancement is applied in an electronic device, in accordance with another embodiment of the present disclosure. The method may begin at block S310.

At block S310, a current brightness of a display panel of the electronic device may be obtained when the video is playing in the display panel.

At block S320, the current brightness may be compared with a target brightness.

At block S330, the video is processed according to the video enhancement corresponding to a predetermined effect when the current brightness is not less than the target brightness.

At block S340, the current brightness is determined whether it is less than a brightness threshold that indicates a cancellation of enhancement when the current brightness is less than the target brightness. The brightness threshold is smaller than the target brightness.

In some embodiment, the electronic device may determine whether it performs the operation of video enhancement according to a comparing result of the current brightness and the brightness threshold. In particular, the electronic device may stop performing the operation of processing the video according to the video enhancement when the current brightness is less than the brightness threshold, i.e., an operation of video enhancement or block S350 may not be performed when the current brightness is less than the brightness threshold. The electronic device may process the video according to a video enhancement corresponding to the effect of video enhancement when the current brightness is not less than the brightness threshold; i.e., block S350 may be performed when the current brightness is less than the brightness threshold.

At block S350, an effect of video enhancement is determined according to the current brightness, when the current brightness is not less than the brightness threshold but less than the target brightness. The video may be processed according to a video enhancement corresponding to the effect of video enhancement, and the smaller the current brightness is, the weaker the effect of video enhancement is.

At block S360, the electronic device stops process the playing video according to video enhancement when the current brightness is less than the brightness threshold.

In the method for video enhancement provided in the present disclosure, a current brightness of a display panel of the electronic device is obtained when a video is playing in the display panel. The current brightness may be compared with a target brightness. An effect of video enhancement on the video is determined according to the current brightness when the current brightness is less than the target brightness. And the video enhancement is not applied to the video when the current brightness is less than the brightness threshold. Therefore, in the process of the video enhancement for the electronic device while playing video, the electronic device can flexibly determine the effect of video enhancement according to the current brightness. Thereby a flexibility of an adjustment video enhancement effect may be achieved, and a user experience is improved.

Figure 7:
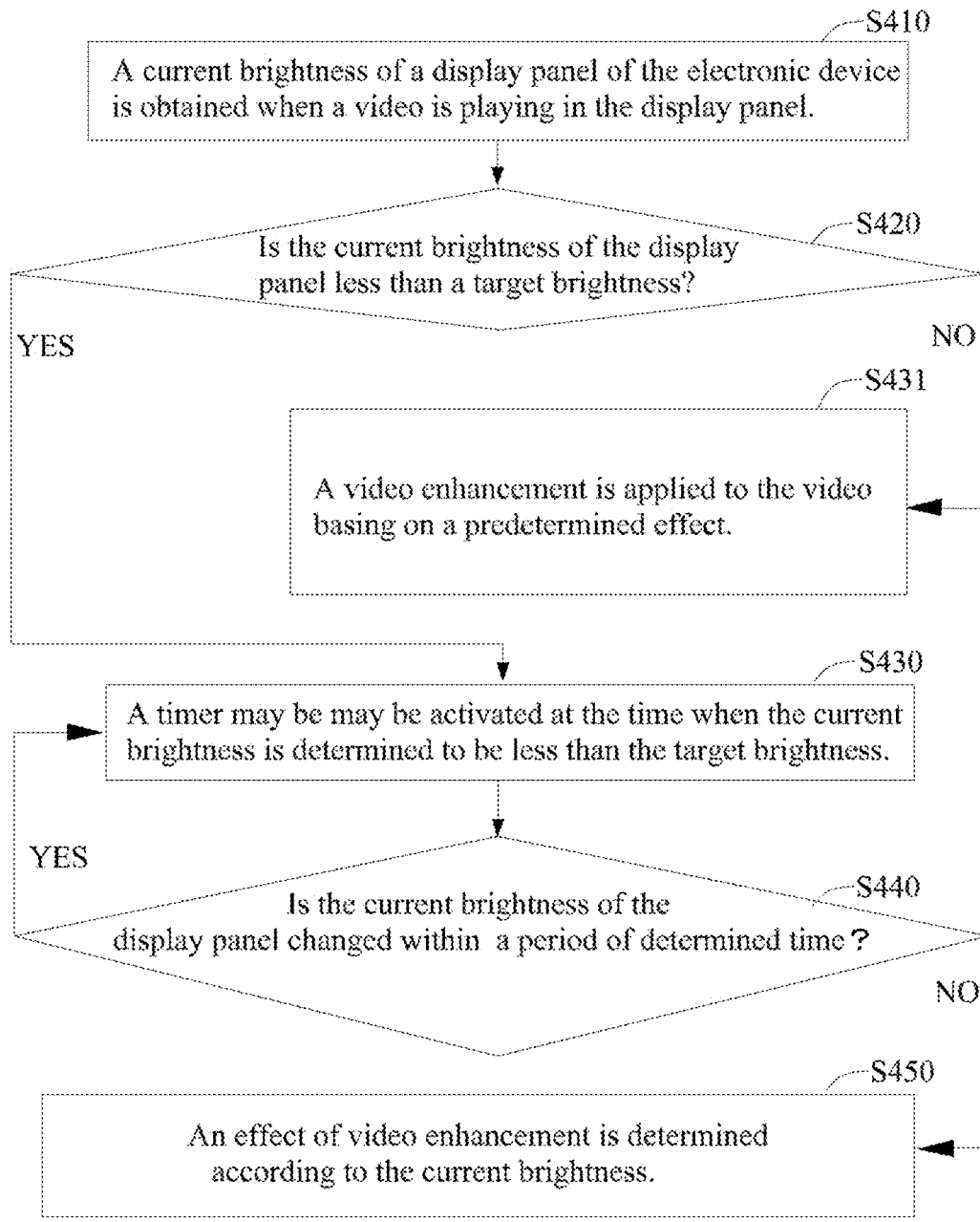
FIG. 7 illustrates a flowchart of a method for video enhancement, in accordance with further another embodiment of the present disclosure.

As illustrated in FIG. 7, a method for video enhancement is applied in an electronic device, in accordance with another embodiment of the present disclosure. The method may begin at block S410.

At block S410, a current brightness of a display panel of the electronic device is obtained when a video is playing in the display panel.

At block S420, the current brightness may be compared with a target brightness.

At block S430, a timer may be activated at the time when the current brightness is determined to be less than the target brightness; and block S440 may be performed. The video may be processed according to a video enhancement corresponding to a predetermined effect when the current brightness is not less than the target brightness; and block S410 is performed.

At block S440, the current brightness may be determined whether it is changed within a period of determined time after the timer is activate.

At block S450, when the current brightness remains unchanged within a period of determined time after the timer is activated, an effect of video enhancement is determined according to the current brightness. The video may be processed according to a video enhancement corresponding to the effect of video enhancement.

It can be understood that in the operation of adjusting a brightness of the display panel, the user sometimes tries to adjust the brightness of the display panel multiple times, and the brightness of the display panel that is adjusted at every time is different from those at other times. However, the electronic device may determine the video enhancement according to the brightness of the display panel when detects that the brightness of the display panel has changed every time. It result in that the electronic may determine a new video enhancement according to a last changed brightness that is determined by the user at the last time, after a previous video enhancement was determined according to a previous brightness that is determined by the user before the last time. Therefore, before the user determines a final brightness of the display panel, a data flow for processing images of the electronic device may be invalid, and a corresponding consumed resources may be wasted. Thus, the effect of video enhancement should be determined according to a final current brightness, wherein the final brightness is the current brightness remaining unchanged within the period of determined time, which may result in that a waste of resources can be reduced. The video may be processed according to a video enhancement corresponding to the effect of video enhancement.

When the current brightness is determined to be changed within the period of determined time after the timer is activated, a changed current brightness of the display panel is obtained. When the changed current brightness is less than the target brightness, the timer may be reactivated at the time when the change occurs to the current brightness, at which the current brightness is changed to the changed current brightness. In an embodiment, block S430 can be re-performed, and then the timer may be reactivated at the time when the change occurs for a determined time.

The effect of video enhancement is determined according to a changed current brightness, when the changed current brightness of the display panel remains unchanged within a new period of determined time after the timer is reactivated. The video may be processed according to a video enhancement corresponding to the effect of video enhancement.

In the method for video enhancement provided in the present disclosure, a current brightness of a display panel of the electronic device is obtained when a video is playing in the display panel. The current brightness may be compared with a target brightness. An effect of video enhancement on the video is determined according to the current brightness when the current brightness is less than the target brightness. And the video enhancement is not applied to the video when the current brightness is less than the brightness threshold. Therefore, in the process of the video enhancement for the electronic device while playing video, the electronic device can flexibly determine the effect of video enhancement according to the current brightness. Thereby a flexibility of an adjustment video enhancement effect may be achieved, and a user experience is improved.

Figure 8:
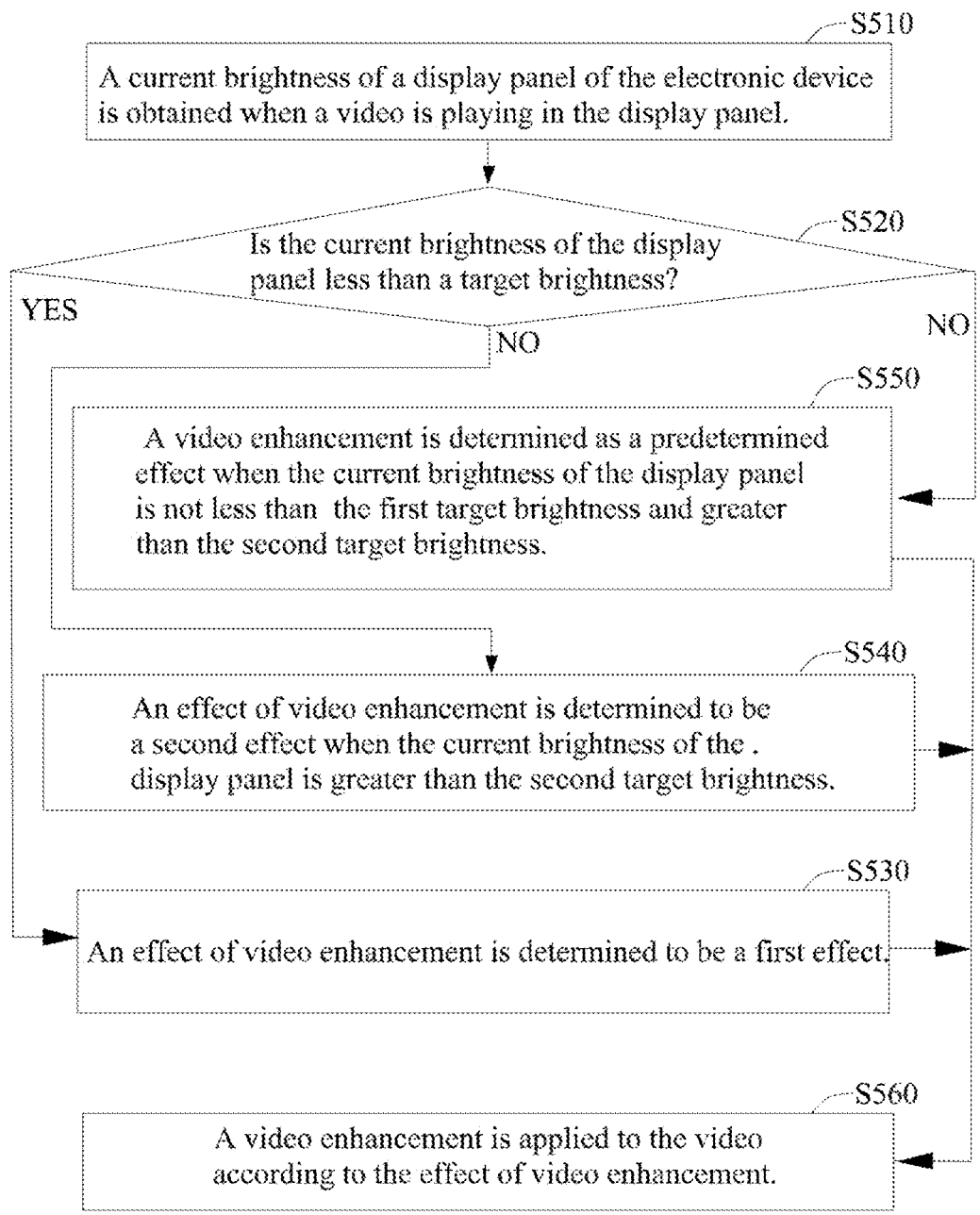
FIG. 8 illustrates a flowchart of a method for video enhancement, in accordance with still another embodiment of the present disclosure.

As illustrated in FIG. 8, a method for video enhancement is applied in an electronic device, in accordance with another embodiment of the present disclosure. The method may begin at block S510.

At block S510, a current brightness of a display panel of the electronic device is obtained when a video is playing in the display panel.

At block S520, the current brightness may be compared with a target brightness.

In an embodiment, the electronic device can determine the target brightness to be an expected brightness configured by the use, as described in block 120. In another embodiment, the electronic device can automatically determine the target brightness according to a usage habits of the user, as described in block 120, which is not repeated herein.

In some embodiment, the target brightness may include a first target brightness and a second target brightness different from the first target brightness. In particular, the second target brightness may be greater than the first target brightness.

At block S530, an effect of video enhancement is determined to be a first effect when the current brightness is less than the first target brightness. The video may be processed according to a video enhancement corresponding to the effect of video enhancement.

The effect of video enhancement may indicate a quality of the video after enhancement. In accordance with embodiment of present disclosure, the effect of video enhancement may include multiple levels of video enhancement, such as a first effect and a second effect different from the first effect, as described in block S130, which is not repeated herein. In some embodiment, the effect of video enhancement may be determined to be the first effect or the second effect, according to the comparing result.

At block S540, the effect of video enhancement is determined to be the second effect when the current brightness is greater than the second target brightness. The video may be processed according to a video enhancement corresponding to the effect of video enhancement.

For an example, the second effect may indicate that there is a little effect on the video. For another example, the second effect may indicate that no video enhancement is configured to be applied to the video.

At block S550, a video enhancement is determined to be a predetermined effect that is determined by a user, when the current brightness is not less than the first target brightness and greater than the second target brightness. The video may be processed according to a video enhancement corresponding to the effect of video enhancement.

In some embodiments, before video enhancement is determined to be a predetermined effect, the predetermined effect should be obtained in advanced. For an example, the predetermined effect may be pre-stored in the electronic device. For another example, the predetermined effect may be configurated by a user, and stored in the electronic device. In some embodiments, at the block S550, the predetermined effect may be obtained when the current brightness not less than the first target brightness and not greater than the second target brightness, and the effect of video enhancement may be determined to be the predetermined effect. The operation of block S550 may be replaced by operations of processing the video according to a video enhancement corresponding to the predetermined effect.

At block S560, the video is processed according to a video enhancement corresponding to the effect of video enhancement.

In some embodiment, the video is processed by adjusting at least one parameters of images of the video, according to a video enhancement corresponding to the effect of video enhancement.

The electronic device usually provides virous serial images successively in a frequency of the video to display on the display panel when the video is playing. Thereby the video is displayed on the display panel, in a visual sensation of the user. The video enhancement is applied to the video by applying an image enhancement to images of the video. In other words, the video may be processed by adjusting at least one parameters of images of the video, according to a video enhancement corresponding to the effect of video enhancement. Therefore, the electronic device may be configured with virous image parameters, and may play the video according to the image parameters. The electronic device may determine at least one of the image parameters, and display the images of the video basing on the at least one of the image parameters, when processing the playing video according to the video enhancement.

In some embodiments, operations of determining the image parameters may include at least one of the following operations: an operation of increasing an exposure, an operation of noise-reduction, an operation of increasing contrast, and an operation of image sharpening.

The image parameters include at least one of a sharpness parameter, a color parameter, a sharpness parameter, a brightness parameter, a contrast parameter, and a saturation level parameter. In some embodiment, different effect of video enhancement may be achieved by adjusting different image parameters. Therefore, the video enhancement is applied to the video to achieve different effect of video enhancement may be achieved by adjusting different image parameters. For example, the electronic device process the video by determining at least a first target parameter and a second target parameter of image parameters of the playing video, wherein the first target parameter and the second parameter are selected from the above image parameters, and the second target parameter is different from the first target parameter. In particular, the electronic device may select the first image parameters from the image parameters according to the first effect, and determine the first target parameter according to the first effect. The electronic device may further select the second image parameters from the image parameters according to the second effect, and determine the second target parameter according to the second effect.

In this case, the first target parameter and the second target parameter may be different from each other. It can be understood that, when the electronic device determines that the current brightness of the display panel is greater than a target value (such as the second target brightness) or less than a target value (such as the first target brightness), the electronic device may process the video according different video enhancements. Therefore different video enhancement effects may be achieved.

For an example, the effect of video enhancement may be determined to be the first effect when the current brightness is less than the first target brightness. The electronic device may select the first target parameter from the image parameters of the video according to the first effect; and determine the first target parameter according to the first effect.

For another example, the effect of video enhancement may be determined to be the second effect when the current brightness is greater than the second target brightness. The electronic device may select the second target parameter from the image parameters of the video according to the second effect; and determine the second target parameter according to the second effect. The second target parameter is different from the first target parameter. For still another example, the effect of video enhancement may be determined to be the predetermined effect when the current brightness not less than the first target brightness and not greater than the second target brightness. The electronic device may process the video according to a video enhancement corresponding to the predetermined effect.

In the method for video enhancement provided in the present disclosure, a current brightness of a display panel of the electronic device is obtained when a video is playing in the display panel. The current brightness may be compared with the first target brightness and the second target brightness. The effect of video enhancement on the video is determined according to comparisons of the current brightness and the first target brightness, and of the current brightness and the second target brightness. And the video enhancement may not be applied to the video when the current brightness is less than the brightness threshold that indicates a cancellation of enhancement. Therefore, in the process of the video enhancement for the electronic device while playing video, the electronic device can flexibly determine the effect of video enhancement according to the current brightness. Thereby a flexibility of an adjustment video enhancement effect may be achieved, and a user experience is improved.

Figure 9:
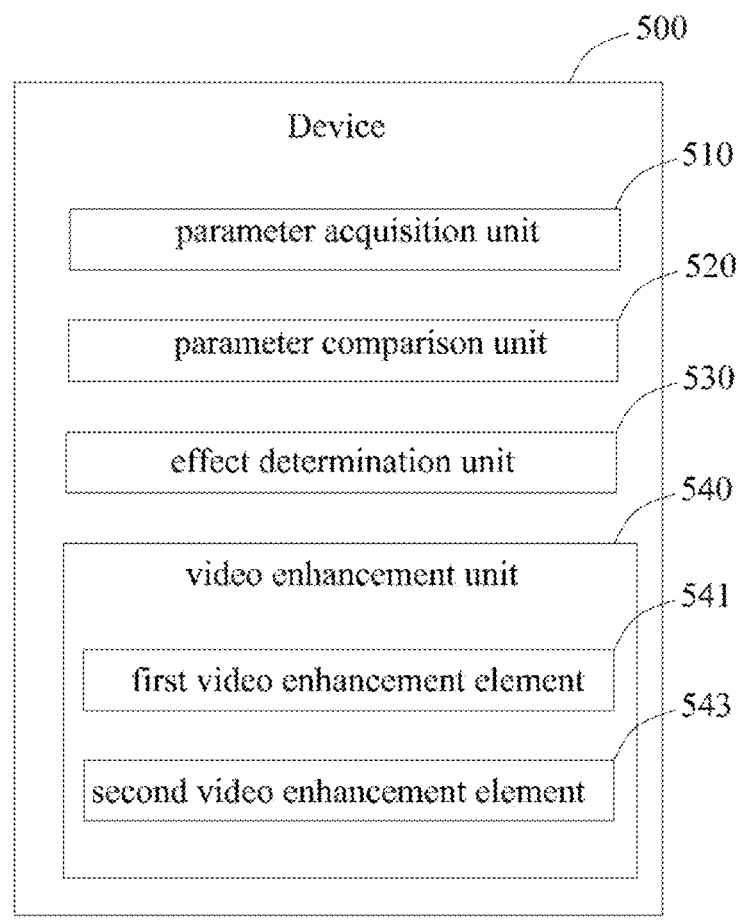
FIG. 9 illustrates a schematic view of functional blocks of a device for video enhancement, in accordance with an embodiment of the present disclosure.

As illustrated in FIG. 9, a device 500 for video enhancement is provided, in accordance with an embodiment of the present disclosure, which is applied in an electronic device. The device 500 may include a parameter acquisition unit 510, a parameter comparison unit 520, an effect determination unit 530, and a video enhancement unit 540.

The parameter obtaining unit 510 is configured to obtain a current brightness of a display panel of the electronic device when a video is playing in the display panel.

The parameter comparison unit 520 is configured to compare the current brightness with a target brightness.

The effect determination unit 530 is configured to determine an effect of video enhancement according to a comparing result of the comparison of the current brightness and the target brightness.

The video enhancement unit 540 is configured to process the video according to a video enhancement corresponding to the effect of video enhancement determined by the effect determination unit 530.

In some embodiment, the video enhancement unit 540 may include a first video enhancement element 541 configured to apply the video enhancement to the video basing on a predetermined effect when the current brightness is not less than the target brightness, and a second video enhancement element 543 configured to apply the video enhancement to the video basing on the effect of video enhancement determined according to the current brightness.

In the device for video enhancement provided in the present disclosure, a current brightness of a display panel of the electronic device is obtained when a video is playing in the display panel. The current brightness may be compared with a target brightness. An effect of video enhancement is determined, according to a comparing result of the current brightness and the target brightness. The video may be processed according to a video enhancement corresponding to the effect of video enhancement. Therefore, in the process of the video enhancement for the electronic device while playing video, the electronic device can flexibly determine the effect of video enhancement according to the current brightness. Thereby a flexibility of an adjustment video enhancement effect may be achieved, and a user experience is improved.

Figure 10:
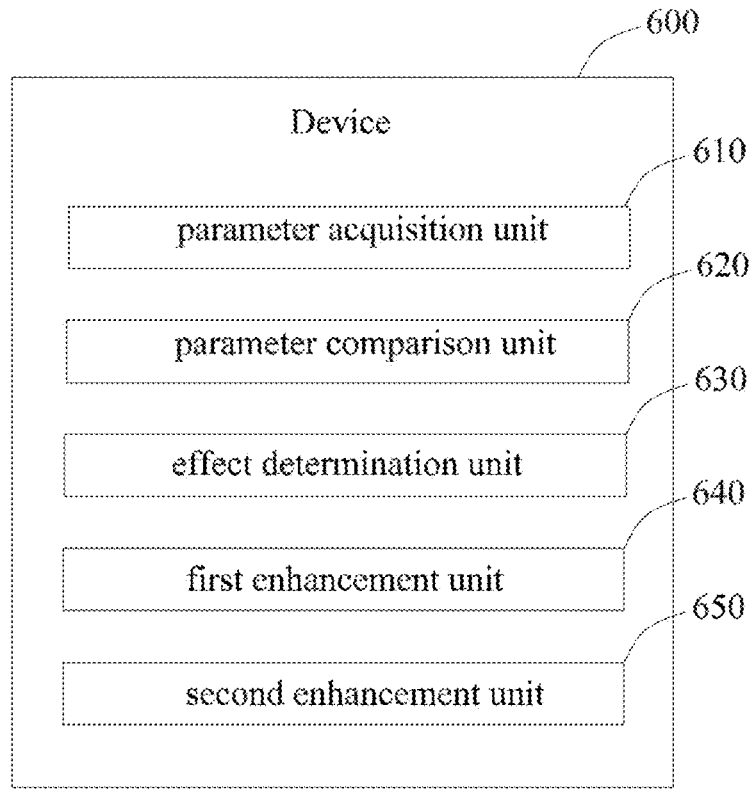
FIG. 10 illustrates a schematic view of functional blocks of a device for video enhancement, in accordance with another embodiment of the present disclosure.

As illustrated in FIG. 10, a device 600 for video enhancement is provided, in accordance with an embodiment of the present disclosure, which is applied in an electronic device. The device 600 may include a parameter acquisition unit 610, a parameter comparison unit 620, an effect determination unit 630, a first video enhancement unit 640, and a second video enhancement unit 650.

The parameter acquisition unit 610 is configured to obtain a current brightness of a display panel of the electronic device when a video is playing in the display panel.

The parameter comparison unit 620 is configured to compare the current brightness with a target brightness.

The effect determination unit 630 is configured to determine an effect of video enhancement according to the current brightness, when the current brightness is less than the target brightness; wherein a smaller the current brightness is, the weaker a corresponding video enhancement effect is. The video may be processed according to a video enhancement corresponding to the effect of video enhancement.

In an embodiment, the effect determination unit 630 is particularly configured to obtain a video enhancement parameter corresponding to the current brightness; wherein the smaller the current brightness is, the weaker a corresponding video enhancement effect indicated by the video enhancement parameter is.

Alternatively, in an operation of determining the effect of video enhancement on the video according to the current brightness, at least one video enhancement parameter corresponding to the current brightness may be obtained; and the effect of video enhancement is determined according to the at least one video enhancement parameter. The smaller the current brightness is, the weaker a corresponding video enhancement effect indicated by the at least one video enhancement parameter is.

In another embodiment, the effect determination unit 630 is particularly configured to determine a difference between the current brightness and the target brightness; and obtain a video enhancement parameter corresponding to the difference, wherein the larger the difference is, the weaker a corresponding video enhancement effect indicated by the video enhancement parameters is; and apply the video enhancement to the video basing on the video enhancement parameter.

The first video enhancement unit 640 is configured to apply the video enhancement to the video basing on a predetermined effect when the current brightness is not less than the target brightness. The second video enhancement unit 650 is configured to apply the video enhancement to the video basing on the effect of video enhancement determined before. In an embodiment, the second video enhancement unit 650 is configured to apply the video enhancement to the video basing on the at least one video enhancement parameter.

In the device for video enhancement provided in the present disclosure, a current brightness of a display panel of the electronic device is obtained when a video is playing in the display panel. The current brightness may be compared with a target brightness. An effect of video enhancement on the video is determined according to the current brightness when the current brightness is less than the target brightness. Therefore, in the process of the video enhancement for the electronic device while playing video, the electronic device can flexibly determine the effect of video enhancement according to the current brightness. Thereby a flexibility of an adjustment video enhancement effect may be achieved, and a user experience is improved.

Figure 11:
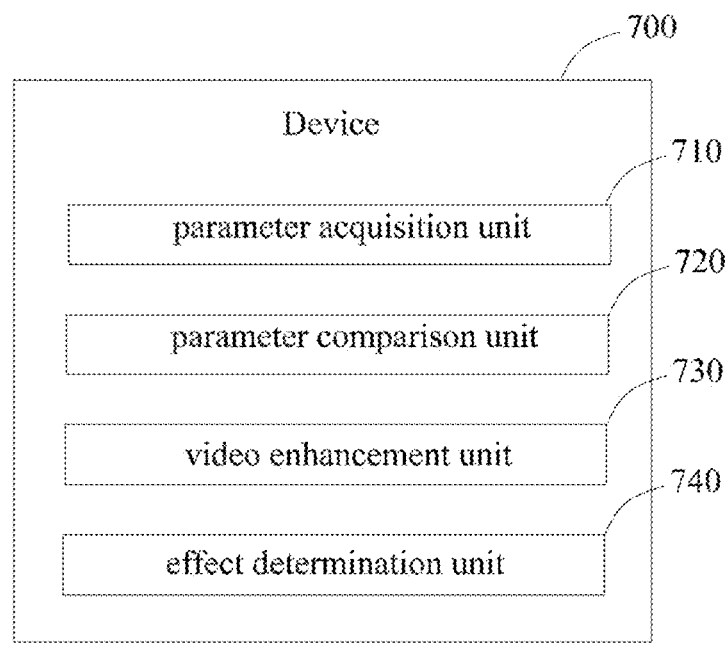
FIG. 11 illustrates a schematic view of functional blocks of a device for video enhancement, in accordance with still another embodiment of the present disclosure.

As illustrated in FIG. 11, a device 700 for video enhancement is provided, in accordance with an embodiment of the present disclosure, which is applied in an electronic device. The device 700 may include a parameter acquisition unit 710, a parameter comparison unit 720, a video enhancement unit 730, and an effect determination unit 740.

The parameter acquisition unit 710 is configured to obtain a current brightness of a display panel of the electronic device when a video is playing in the display panel.

The parameter comparison unit 720 is configured to compare the current brightness with a target brightness.

The video enhancement unit 730 is configured to apply the video enhancement to the video basing on a predetermined effect when the current brightness is not less than the target brightness.

The parameter comparison unit 720 is further configured to determine whether the current brightness is less than a brightness threshold that indicates a cancellation of enhancement when the current brightness is less than the target brightness.

The effect determination unit 740 is configured to determine an effect of video enhancement according to the current brightness, when the current brightness is not less than the brightness threshold; wherein the smaller the current brightness is, the weaker the effect of video enhancement is. The video may be processed according to a video enhancement corresponding to the effect of video enhancement.

The video enhancement unit 730 is further configured to stop processing the playing video according to the video enhancement when the current brightness is less than the brightness threshold.

In the method for video enhancement provided in the present disclosure, a current brightness of a display panel of the electronic device is obtained when a video is playing in the display panel. The current brightness may be compared with a target brightness. An effect of video enhancement on the video is determined according to the current brightness when the current brightness is less than the target brightness. And the video enhancement is not applied to the video when the current brightness is less than the brightness threshold. Therefore, in the process of the video enhancement for the electronic device while playing video, the electronic device can flexibly determine the effect of video enhancement according to the current brightness. Thereby a flexibility of an adjustment video enhancement effect may be achieved, and a user experience is improved.

Figure 12:
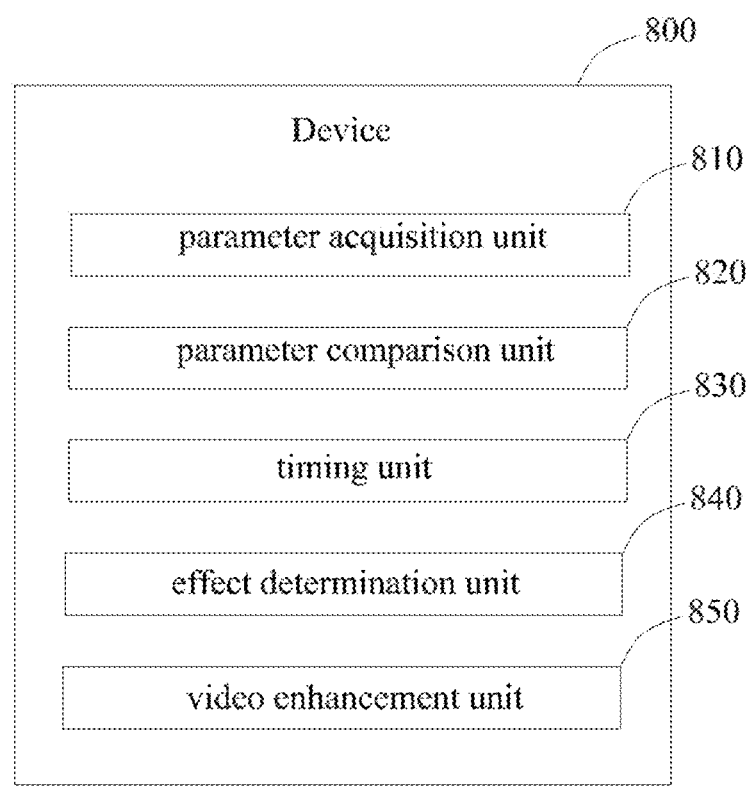
FIG. 12 illustrates a schematic view of functional blocks of a device for video enhancement, in accordance with further another embodiment of the present disclosure.

As illustrated in FIG. 12, a device 800 for video enhancement is provided, in accordance with an embodiment of the present disclosure, which is applied in an electronic device. The device 800 may include a parameter acquisition unit 810, a parameter comparison unit 820, a timing unit 830, an effect determination unit 840, and a video enhancement unit 850.

The parameter acquisition unit 810 is configured to obtain a current brightness of a display panel of the electronic device when a video is playing in the display panel.

The parameter comparison unit 820 is configured to compare the current brightness with a target brightness.

The timing unit 830 is configured to start timing for a determined time when the current brightness is less than the target brightness.

The effect determination unit 840 is configured to determine an effect of video enhancement on the video according to the current brightness, when the current brightness remains unchanged within a period of determined time.

When the current brightness is changed within the period of determined time, a changed current brightness is obtained. When the changed current brightness of the display panel is less than the target brightness, the timing unit 830 is further configured to restart timing for the determined time at the time when a change occurs to the current brightness, at which the current brightness is changed to the changed current brightness.

The effect determination unit 840 is further configured to determine an effect of video enhancement according to the changed current brightness, when the changed current brightness of the display panel remains unchanged within a new period of determined time after the timer is reactivated.

The video enhancement unit 850 is configured to apply the video enhancement to the video based on the effect of video enhancement determined before.

In the device for video enhancement provided in the present disclosure, a current brightness of a display panel of the electronic device is obtained when a video is playing in the display panel. The current brightness may be compared with a target brightness. An effect of video enhancement on the video is determined according to the current brightness when the current brightness is less than the target brightness. And the video enhancement is not applied to the video when the current brightness is less than the brightness threshold. Therefore, in the process of the video enhancement for the electronic device while playing video, the video may be displayed with extremely clear images and may have an extremely clear visual effect. The electronic device can flexibly determine the effect of video enhancement according to the current brightness. Thereby a flexibility of an adjustment video enhancement effect may be achieved, and a user experience is improved.

It should be noted that those skilled in the art can clearly understand that for the convenience and brevity of the description, the specific working process of the foregoing device and unit may refer to the corresponding process in the foregoing method embodiment, and details are not described herein again. In several embodiments provided herein, the coupling of functional modules to one another may be electrical. In addition, each of the functional module in each of the embodiments of the present disclosure may be integrated into one processing module, or each of the functional modules may be provided physically separately, or, two or more of the functional modules may be integrated into one module.

It should be noted that, in the present disclosure, an operation of encoding the video data according to an audio coding type may apply an existing technology, which is not described in detail in this description.

In the method and device for video enhancement, and the electronic device provided in the present disclosure, a current brightness of a display panel of the electronic device is obtained when a video is playing in the display panel. The current brightness may be compared with a target brightness. An effect of video enhancement is determined, according to a comparing result of the current brightness and the target brightness. The video may be processed according to a video enhancement corresponding to the effect of video enhancement. Therefore, in the process of the video enhancement for the electronic device while playing video, the video may be displayed with extremely clear images and may have an extremely clear visual effect. The electronic device can flexibly determine the effect of video enhancement according to the current brightness. Thereby a flexibility of an adjustment video enhancement effect may be achieved, and a user experience is improved.

An electronic device provided by the present disclosure will be described below with reference to FIG. 13.

Figure 13:
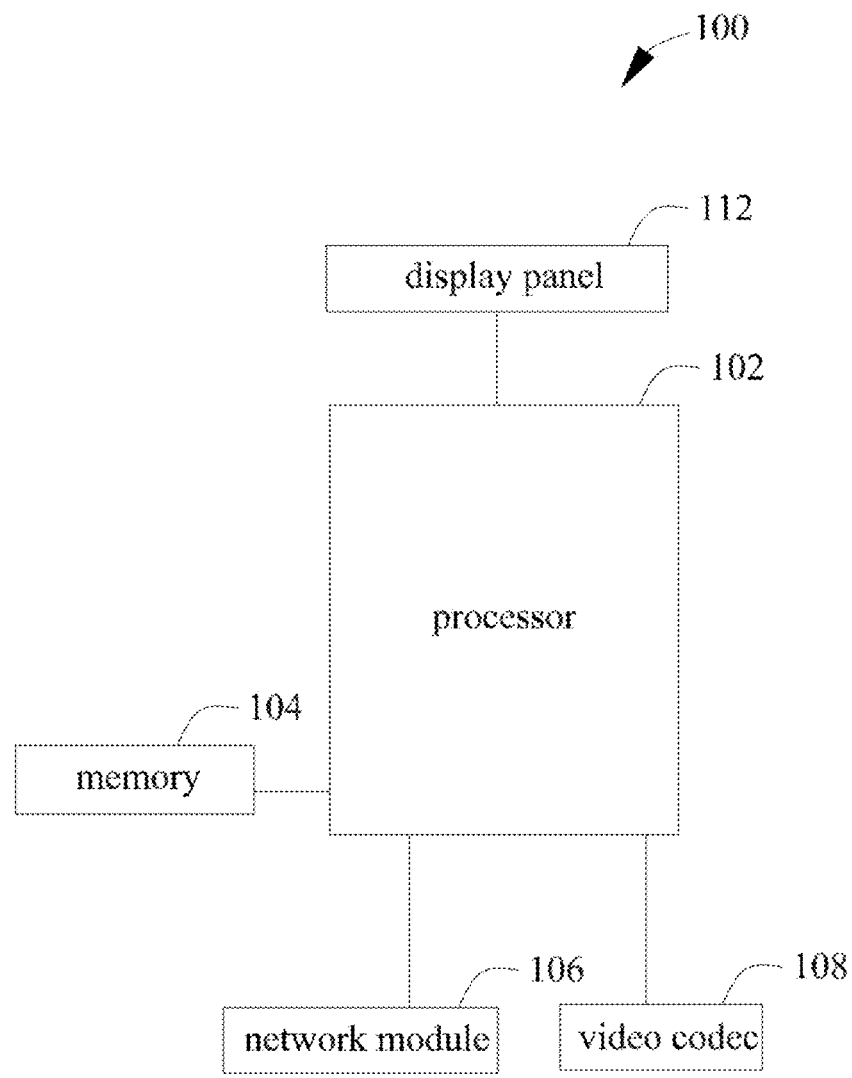
FIG. 13 illustrates a schematic view of functional blocks of an electronic device that applies a method for video enhancement of the present disclosure, in accordance with an embodiment of the present disclosure.

As illustrated in FIG. 13, based on the method and device for video enhancement described above, another electronic device 100 that can perform the foregoing method for video enhancement is further provided, in accordance with the embodiments of the present disclosure. The electronic device 100 includes one or more (only one illustrated) processor 102, a memory 104, a network module 106, video codec 108, a gesture acquisition module 110, and a display panel 112 coupled to each other. The memory 104 stores therein a program that can execute the operations of the foregoing embodiments, and the processor 102 can execute the program stored in the memory 104.

The processor 102 can include one or more processing cores. The processor 102 is coupled to various components of the electronic device 100 via various interfaces and lines, and perform various functions and processing data of the electronic device 100 by executing or running instructions, programs, sets of code and sets of instructions stored in the memory 104, and by invoking data stored in the memory 104. Alternatively, the processor 102 may be selected from at least one of a digital signal processing (DSP), a field-programmable gate array (FPGA), and a programmable logic array (PLA). The processor 102 can integrate one or a combination of any of a central processing unit (CPU), a graphics processing unit (GPU), a modem, and the like. The CPU mainly deals with the operating system, user interface and applications, etc.; and the GPU is responsible for rendering and rendering of the display content. The modem is used to supply a wireless communication. It can be understood that the above modem may also be integrated into the processor 102 and implemented by a single communication chip.

The memory 104 may include a random-access memory (RAM), and may also include a read-only memory. Memory 104 can be used to store instructions, programs, code, code sets, or sets of instructions. The memory 104 may include a program storage area and a data storage area, wherein the program storage area may store instructions for implementing an operating system, instructions for implementing at least one function (such as a touch function, a sound playing function, an image playing function, etc.), instructions for implementing the above-mentioned method embodiments, and the like. The storage data area can also store data (such as phone book, audio and video data, chat record data) created by the terminal 100 in use.

The network module 106 is configured to receive and transmit electromagnetic waves, and perform a mutual conversion between electromagnetic waves and electrical signals. Thereby communicating with a communication network or other devices, for example, communicating with wireless access points, may be achieved. The network module 106 can include various circuit elements for performing these functions above, such as an antenna, a radio frequency transceiver, a digital signal processor, an encryption/decryption chip, a Subscriber Identity Module (SIM) card, a memory, etc. The network module 106 can communicate with various networks such as the Internet, an intranet, a wireless network, or communicate with other devices via a wireless network. The wireless network described above may include a cellular telephone network, a wireless local area network, or a metropolitan area network.

The video codec 108 can be configured to decode data requested by the network module 106 from the network, thus the data may be transmitted to the display panel 112 for displaying. Particularly, the video codec 108 can be a GPU, a dedicated DSP, an FPGA, an ASIC chip, or the like.

Figure 14:
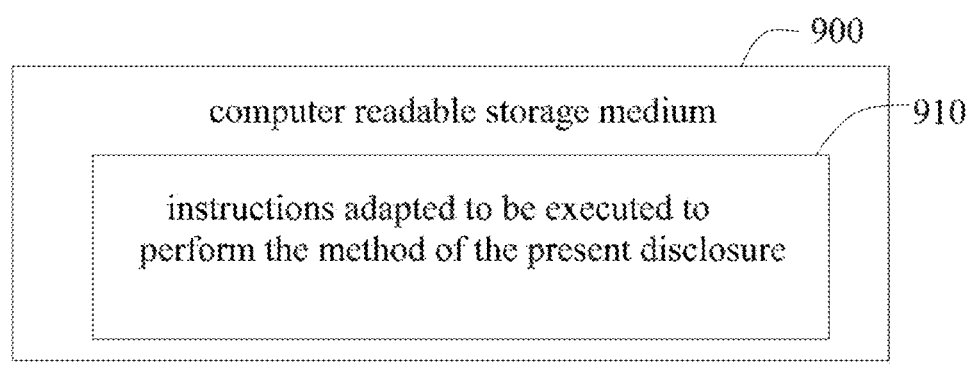
FIG. 14 illustrates a view of a computer readable storage medium for saving or carrying instructions implementing an image processing method of the present disclosure, in accordance with an embodiment of the present disclosure.

As illustrated in FIG. 14, FIG. 14 illustrates a functional block diagram of a computer readable storage medium provided by an embodiment of the present disclosure. The computer readable storage medium 900 is configured to store one or more programs configured to be executed by one or more processors of an electronic device, the one or more programs comprising instruction (program code) for performing the method described in the above method embodiments.

The computer readable storage medium 900 can be an electronic memory such as a flash memory, an EEPROM (Electrically Erasable Programmable Read Only Memory), an EPROM, a hard disk, or an ROM. Alternatively, computer readable storage medium 900 includes a non-transitory computer-readable storage medium. Computer readable storage medium 900 has a storage space for program code 910 that performs any of the operations of the methods described above. The program code can be read from or written to one or more computer program products. Program code 910 can be compressed, for example, in a suitable form.

The method, device, and electronic device for video enhancement provided by the embodiments of the present disclosure are described in detail. The principles and embodiments of the present disclosure are described in the above examples. The description is only used for helping to understand the technical solution of the present disclosure and its core idea. Those of ordinary skill in the art should understand that it can still modify the technical solutions described in foregoing embodiments, or replace some of the technical features. The modifications or substitutions do not depart from the scope of the technical solutions of the embodiments of the present disclosure.

What is claimed is:

1. A method for video enhancement, applied to an electronic device, comprising:
   obtaining a current brightness of a display panel of the electronic device when a video is playing in the display panel;
   comparing the current brightness with a target brightness;
   determining an effect of video enhancement according to a comparing result of the current brightness and the target brightness, comprising:
      determining an effect of video enhancement according to the current brightness, when the current brightness is less than the target brightness, wherein the smaller the current brightness is, the weaker the effect of video enhancement is; and
      determining an effect of video enhancement to be a predetermined effect when the current brightness is not less than the target brightness; and
   processing the video according to a video enhancement corresponding to the effect of video enhancement.

2. The method of claim 1, wherein processing the video according to a video enhancement corresponding to the effect of video enhancement, comprising:
   processing the video, by adjusting at least one parameters of images of the video, according to a video enhancement corresponding to the effect of video enhancement.

3. The method of claim 1, wherein the target brightness comprises a first target brightness;
   the operation of determining an effect of video enhancement according to a comparing result of the current brightness and the target brightness comprises:
      determining the effect of video enhancement to be a first effect when the current brightness is less than the first target brightness;
   wherein the operation of processing the video according to a video enhancement corresponding to the effect of video enhancement, comprises:
      selecting a first target parameter from the image parameters of the video according to the first effect; and
      determining the first target parameter according to the first effect.

4. The method of claim 3, wherein the target brightness further comprises a second target brightness, and the second target brightness is greater than the first target brightness;
   the operation of determining an effect of video enhancement according to a comparing result of the current brightness and the target brightness, further comprises:
      determining the effect of video enhancement to be a second effect when the current brightness is greater than the second target brightness;
   wherein the operation of processing the video according to a video enhancement corresponding to the effect of video enhancement, further comprises:
      selecting a second target parameter from the image parameters of the video according to the second effect; and
      determining the second target parameter according to the second effect;
   wherein the second target parameter is different from the first target parameter.

5. The method of claim 4, wherein,
   the operation of determining an effect of video enhancement according to a comparing result of the current brightness and the target brightness, further comprises:
      obtaining a predetermined effect when the current brightness not less than the first target brightness and not greater than the second target brightness; and
      determining the effect of video enhancement to be the predetermined effect;
   the operation of processing the video according to a video enhancement corresponding to the effect of video enhancement, further comprises: processing the video according to a video enhancement corresponding to the predetermined effect.

6. The method of claim 3, wherein the image parameters comprises at least one of a sharpness parameter, a lens distortion parameter, a color gamut parameter, a color parameter, a clarity parameter, a brightness parameter, a contrast parameter, a noise reduction parameter, and a saturation parameter.

7. The method of claim 1, wherein before processing the video according to a video enhancement corresponding to the effect of video enhancement, the method further comprises:
   determining whether the current brightness is less than a brightness threshold that indicates a cancellation of enhancement; and
   performing the operation of processing the video according to a video enhancement corresponding to the effect of video enhancement when the current brightness is not less than the brightness threshold; wherein the operation of processing the video according to a video enhancement corresponding to the effect of video enhancement is not performed when the current brightness is less than the brightness threshold.

8. The method of claim 1, wherein before comparing the current brightness with a target brightness, the method further comprises:
   activating a timer and starting timing at the time when the current brightness is obtained; and
   when the current brightness remains unchanged within a period of determined time after the timer is activated, performing the operation of comparing the current brightness with the target brightness.

9. The method of claim 8, after activating a timer and starting timing at the time when the current brightness is obtained, the method further comprising:
   reactivating a timer and restarting timing at the time when the current brightness is changed to a changed current brightness within the period of determined time; and
   when the changed current brightness remains unchanged within a period of determined time after the timer is reactivated, comparing the changed current brightness with the target brightness; and
   performing the operation of determining an effect of video enhancement according to a comparing result of the current brightness and the target brightness.

10. The method of claim 1, wherein the operation of determining an effect of video enhancement according to the current brightness, comprises:
    obtaining at least one video enhancement parameter corresponding to the current brightness; and
    determining an effect of video enhancement according to the at least one video enhancement parameter.

11. The method of claim 1, wherein the operation of determining an effect of video enhancement according to the current brightness, comprises:

determining a difference between the current brightness and the target brightness;
obtaining a video enhancement parameter corresponding to the difference; and
determining an effect of video enhancement basing on the video enhancement parameter.

12. The method of claim 1, wherein before comparing the current brightness with the target brightness, the method further comprises:
determining the target brightness determined to be an expected brightness that is predetermined, wherein the expected brightness is input into the electronic device basing on an input instruction when the video is playing.

13. The method of claim 1, wherein before comparing the current brightness with the target brightness, the method further comprises:
determining the target brightness according to a usage habit of a user, by:
obtaining an expected brightness predetermined basing on an input instruction when the video is playing;
storing the expected brightness associating with a light intensity of an environment in which the electronic device is currently located; and
determining the target brightness that is corresponding to the light intensity to be a half of the expected brightness.

14. The method of claim 1, wherein before obtaining a current brightness of a display panel of the electronic device when a video is playing in the display panel, the method further comprises:
determining whether or not the electronic device is running a predetermined video player; and
determining the electronic device to be playing the video when the predetermined video player is running in the electronic device.

15. The method of claim 1, wherein before obtaining a current brightness of a display panel of the electronic device when a video is playing in the display panel, the method further comprises:
obtaining a compressed and encoded video; and
decoding and displaying the video; wherein the electronic device is capable of decoding the video by both of hardware decode and software decode; and in the process of decoding the video, the operation of obtaining a current brightness of a display panel of the electronic device when a video is playing in the display panel is performed.

16. The method of claim 15, wherein the compressed and encoded video comprises data in RGBA format; when the video is decoded, the data in RGBA format is converted into data in HSV format by:
obtaining a histogram of image content of images of the video;
applying a statistics to the histogram whereby obtaining a converting parameter for converting the data in RGBA format into the data in HSV format; and
converting the data in RGBA format into the data in HSV format basing on the converting parameter.

17. A device for video enhancement, applied to an electronic device, comprising:
a parameter obtaining unit, configured to obtain a current brightness of a display panel of the electronic device when a video is playing in the display panel;
a parameter comparison unit, configured to compare the current brightness of the display panel with a target brightness;
an effect determination unit, configured to determine an effect of video enhancement according to a comparing result of the parameter comparison unit; and
a video enhancement unit, configured to process the video according to a video enhancement corresponding to the effect of video enhancement,
wherein, before comparing the current brightness with the target brightness, the parameter obtaining unit is further configured to determine the target brightness according to a usage habit of a user, by:
obtaining an expected brightness predetermined basing on an input instruction when the video is playing;
storing the expected brightness associating with a light intensity of an environment in which the electronic device is currently located; and
determining the target brightness that is corresponding to the light intensity to be a half of the expected brightness.

18. The device of claim 17, wherein when processing the video, the video enhancement unit is configured to process the video by adjusting at least one parameters of images of the video according to a video enhancement corresponding to the effect of video enhancement.

19. An electronic device, comprising one or more processors, a video codec, a memory; and one or more programs, wherein the one or more programs are stored in the memory and configured to be executed by the one or more processors; and when the one or more programs are executed the processor performs a method for video enhancement, which comprises:
obtaining a current brightness of a display panel of the electronic device when a video is playing in the display panel;
determining a target brightness according to a usage habit of a user, comprising:
obtaining an expected brightness predetermined basing on an input instruction when the video is playing;
storing the expected brightness associating with a light intensity of an environment in which the electronic device is currently located; and
determining the target brightness that is corresponding to the light intensity to be a half of the expected brightness;
comparing the current brightness with the target brightness;
determining an effect of video enhancement according to a comparing result of the current brightness and the target brightness; and
processing the video, by adjusting at least one parameters of images of the video, according to a video enhancement corresponding to the effect of video enhancement.

* * * * *